(No Model.)

E. G. MILES.
INTERFERING PAD FOR HORSES.

No. 300,718. Patented June 17, 1884.

Witnesses:
A. U. Wood
J. M. Abbott

Inventor:
Edwin G. Miles
by Atty.
Sheldon A. Wood

UNITED STATES PATENT OFFICE.

EDWIN G. MILES, OF FENTON, MICHIGAN.

INTERFERING-PAD FOR HORSES.

SPECIFICATION forming part of Letters Patent No. 300,718, dated June 17, 1884.

Application filed June 11, 1883. (No model.)

*To all whom it may concern:*

Be it known that I, EDWIN G. MILES, of Fenton, in the county of Genesee and State of Michigan, have invented an Improvement in Interfering-Pads for Horses, of which the following is a specification.

The nature of my invention relates to certain new and novel improvements in the construction of interfering-pads for horses.

The invention consists in the peculiar construction and arrangement of the various parts, all as more fully hereinafter set forth.

Figure 1:
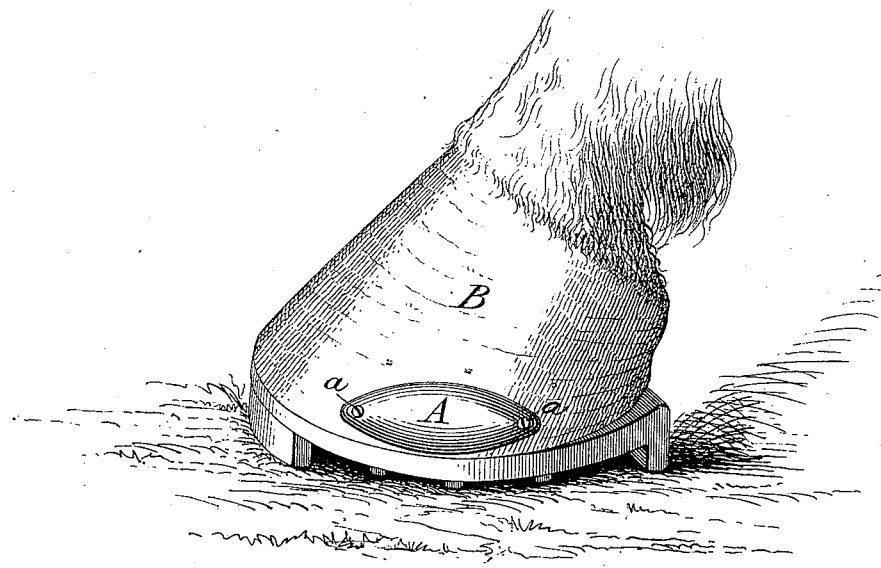
Figure 2:

In the drawings, Figure 1 is a perspective view showing my improved interfering-pad as secured to a hoof. Fig. 2 is a view of the screw employed in securing the pad to the hoof.

In the drawings which accompany and form a part of this specification, A represents the pad, made from rubber or other suitable material, of the size and shape desired. The rear face of this pad is concave, so as to fit snugly against the hoof B, to which it is secured by two screws, $a\ a$, which pass through the pad and enter the shell of the hoof. The holes through which the screws pass are countersunk, in order to prevent the heads of the screws from projecting beyond the face of the pad.

Heretofore interfering-pads have been fastened by an iron clip passing beneath the hoof, and liable to come off by the casting of the shoe, or fastened by a strap passing around the hoof, this construction being objectionable, because the strap is apt to come loose, allowing the pad to slip out of place, and, moreover, the strap is apt to chafe. Furthermore, some hoofs are unable to bear the compression of the strap without injury. As formerly constructed, interfering-pads were liable to slip out of place and become wholly inoperative. This pad is secured directly to the hoof by means of peculiar screws made and constructed especially for the purpose, the thread being extended till it meets the head. Ordinary screws will not answer the purpose. This pad does away with shin, ankle, knee, and arm boots.

What I claim as my invention is—

An interfering-pad, A, made of rubber or other suitable material, having a concave inner face to fit the hoof B, and provided with perforations, as shown and described, whereby the pad is secured rigidly to the hoof direct by means of screws $a\ a$, all substantially as described.

E. G. MILES.

Witnesses:
S. A. WOOD,
F. E. MILES.